United States Patent [19]

Toeniskoetter et al.

[11] 3,923,525

[45] *Dec. 2, 1975

[54] FOUNDRY COMPOSITIONS

[75] Inventors: Richard H. Toeniskoetter, Worthington; John J. Spiwak, Columbus, both of Ohio

[73] Assignee: Ashland Oil, Inc., Ashland, Ky.

[*] Notice: The portion of the term of this patent subsequent to Jan. 6, 1993 has been disclaimed.

[22] Filed: Apr. 17, 1973

[21] Appl. No.: 351,903

[52] U.S. Cl. ............ 106/38.3; 106/38.35; 106/38.9; 106/85; 106/286
[51] Int. Cl.² ............................................. B28B 7/34
[58] Field of Search............... 106/38.3, 38.35, 38.9, 106/85, 286

[56] References Cited

UNITED STATES PATENTS

| | | | |
|---|---|---|---|
| 2,522,548 | 9/1950 | Streicher | 106/38.9 |
| 2,995,453 | 8/1961 | Noble et al. | 106/38.9 |
| 3,661,608 | 5/1972 | Ralston | 106/286 |
| 3,746,557 | 7/1973 | Shimazaki et al. | 106/85 |

*Primary Examiner*—Lorenzo B. Hayes

[57] ABSTRACT

A foundry composition containing a foundry aggregate and a binder comprising a boron-containing aluminum phosphate, a material containing both an alkaline earth metal and an oxide, and water.

24 Claims, No Drawings

FOUNDRY COMPOSITIONS

BACKGROUNDD OF THE INVENTION

The present invention relates to binder compositions and methods for curing such binder compositions. In particular, the present invention relates to binder compositions useful in the foundry art for making cores and molds which are capable of hardening at ambient temperature.

In the foundry art, cores and molds for use in making metal casings are commonly prepared from mixtures of an aggregate material such as sand, which have been combined with a bonding amount of a curable or polymerizable binder. Frequently, minor amounts of other materials are also included in these mixtures. Such other materials include iron oxide, ground flax fibers, powdered coal, clay, and the like. The binder permits such a foundry mix to be molded or shaped into the desired form and thereafter cured to form a self-supporting structure.

Typically, sand is used as the aggregate material. After the sand and binder have been mixed, the resulting foundry sand mix is rammed, blown or otherwise introduced into a pattern, thereby assuming the shape defined by the adjacent surfaces of the pattern. Then, the polymerizable binder is caused to polymerize, sometimes with the aid of catalysts (e.g. ammonium chloride) and/or the use of heat, thereby converting the formed, uncured plastic, foundry sand mix, into a hard solid, cured state. This hardening can be accomplished in the original pattern, or in a holding pattern.

Certain of the prior art processes are quite effective. However, many of the binders now employed require natural or synthetic organic materials. These binders are therefore undesirable from an ecological viewpoint since upon exposure to elevated temperatures they invariably emit some quantity of organic material into the atmosphere. The emitted materials therefore can be a cause of atmospheric pollution and irritation to those persons exposed to the emitted organic materials.

Moreover, in an effort to prepare shapes without the necessity for using organic materials, various prior attempts have been made to prepare binders from inorganic substances such as the silicates. However, prior art binders from inorganic substances have suffered from one or more deficiencies. Typical of the deficiencies exhibited by prior art inorganic binders including the silicates suggested for foundry application have been poor collapsibility of the foundry shape and poor removal or shake out of the foundry shape from the metal casting. Also, many of the suggested inorganic binders exhibit inadequate bonding strength properties and/or undesirable cure characteristics.

Moreover, various prior art inorganic binders such as the silicates provide foundry shapes which possess poor scratch resistance at strip and accordingly, such shapes require at least a few additional hours after strip time has been achieved to develop adequate scratch resistance. In view of the poor scratch resistance at strip, such foundry shapes cannot be readily handled at strip because of the danger of damage to the shape. Moreover, the sag resistance at strip of foundry shapes prepared from various prior art binders is not good.

It is therefore an object of the present invention to provide foundry binder compositions capable of curing without heating.

It is still another object of the present invention to provide foundry binder compositions which contain primarily inorganic materials and accordingly do not require the presence of relatively large amounts of organic substances which emit polluting by-products during casting.

Another object of the present invention is to provide inorganic binder systems for foundry shapes which possess relatively good collapsibility and shake out properties as compared to various other suggested inorganic binders. Also, it is an object of the present invention to provide inorganic binder systems for foundry shapes which possess acceptable strength characteristics.

It is another object of the present invention to provide foundry shapes employing inorganic binder which possess good scratch and sag resistance at strip. Likewise, it is an object of the present invention to provide foundry shapes from inorganic binder systems which can be readily and easily handled at strip.

It is still another object of the present invention to provide a process for producing cores and other foundry shapes from foundry mixes incorporating the binder compositions of the present invention.

SUMMARY OF THE INVENTION

The present invention is concerned with compositions for the fabrication of foundry shapes having a porosity sufficient to permit escape from the shape of at least most of the volatiles formed during casting which comprise:

A. a major amount of foundry aggregate in a sufficient quantity and having a particle size large enough to provide sufficient porosity in the foundry shape to permit escape of volatiles from the shape during casting;
B. an effective bonding amount up to about 10% by weight based upon the weight of the aggregate of a composition comprising:
 1. an aluminum phosphate containing boron in an amount up to about 40 mole % based upon the moles of aluminum, and containing a mole ratio of phosphorus to total moles of aluminum and boron of about 2:1 to about 4:1;
 2. an alkaline earth material containing both an alkaline earth metal and an oxide; and
 3. water.

The amount of the aluminum phosphate component is from about 60 to about 95% by weight based upon the total weight of the aluminum phosphate and the alkaline earth material, and the amount of the alkaline earth material is from about 5 to about 40% by weight based upon the total weight of the aluminum phosphate and alkaline earth material. The amount of water is from about 15 to about 50% by weight based upon the total weight of the aluminum phosphate and the water.

The present invention is also concerned with a foundry process which comprises mixing foundry aggregate with a bonding amount of up to about 10% by weight based upon the weight of the aggregate of the abovedefined binder composition to thereby form a foundry mix.

DESCRIPTION OF THE PREFERRED EMBODIMENTS

The aggregate which may be employed in the present invention is that commonly used in preparing foundry structures and in particular sand. The aggregate employed in the present invention has a particle size large enough to provide sufficient porosity in the foundry shape to permit escape of volatiles from the shape during the casting operation. Generally, at least about 80% and preferably at least about 90% by weight of aggregate employed in the present invention has an average particle size no smaller than about 150 mesh (Tyler screen mesh), and preferably has an average particle size between about 50 and about 120 mesh (Tyler screen mesh). The preferred aggregate employed in the present invention is silica sand wherein at least about 70 weight % and preferably at least about 85 weight % of the sand is silica. Other suitable aggregate materials include zircon, olivine, alumino silicate sand, chromite sand, and the like.

Although the aggregate employed is preferably dry, it can contain small amounts of moisture such as amounts up to about 0.3% by weight or even higher based on the weight of the aggregate. Such moisture present on the aggregate can be compensated for by reducing the quantity of water added to the foundry mix along with the aluminum phosphate and alkaline earth material.

The aggregate constitutes the major constituent and the binder constitutes a relatively minor amount, generally less than about 10% by weight and frequently within the range of about 0.5 to about 7% by weight, based upon the weight of the aggregate. Most often, the binder content range is from about 1 to about 5% by weight based upon the weight of the aggregate.

The binder system employed in the present invention is obtained from an aluminum phosphate, an alkaline earth material, and water. The aluminum phosphate and water, if admixed, generally have a viscosity between about 100 and 2,000 centipoises and preferably between about 200 and 1,000 centipoises.

The aluminum phosphate constituent of the binder system of the present invention is an aluminum phosphate which contains boron in an amount up to about 40 mole % based upon the moles of aluminum of the aluminum phosphate. Also, the aluminum phosphate contains a mole ratio of phosphorous to total moles of aluminum and boron of about 2:1 to about 4:1 and preferably from about 2.5:1 to about 3.5:1 and more preferably from about 2.8:1 to about 3.2:1.

Any of the several known methods may be employed to produce an aluminum phosphate suitable for the present purposes. In particular those methods wherein the aluminum oxide containing reactant is completely dissolved are preferred.

The aluminum phosphate also is preferably prepared from either $P_2O_5$ or concentrated phosphoric acid of from about 70 to about 86% by weight $H_3PO_4$ concentration. The preferred concentrated phosphoric acid solution contains about 86% by weight of $H_3PO_4$. Of course, other sources of phosphorus such as polyphosphoric acids, can be employed, if desired.

The amount of aluminum phosphate employed in the binder system is from about 60 to about 95% by weight and preferably from about 65 to about 90% by weight based upon the total weight of aluminum phosphate and alkaline earth material, and the amount of alkaline earth material is from about 5 to about 40%, and preferably from about 10 to about 35% by weight based upon the total weight of aluminum phosphate and alkaline earth material.

The preferred aluminum phosphates employed in the present invention contain boron and are preferably obtained from boric acid and/or boric oxide. These preferred aluminum phosphates are preferably, but not necessarily, prepared by reacting together the phosphoric acid or $P_2O_5$; and alumina such as alumina trihydrate ($Al_2O_3 \cdot 3H_2O$); and boric acid or boric oxide.

Since the reaction is exothermic, it can generally proceed by merely admixing the reactants and permitting the exotherm to raise the temperature of the reaction mass until the exotherm peaks usually at about 200° to 230° F. After the exotherm peaks, it may be advantageous to apply external heat for about ½ to 2 hours to maintain a maximum reaction temperature between about 200° and about 250° F to ensure completion of the reaction. Also, in some instances, it may be desirable to initiate the reaction by applying external heat just until the exotherm begins.

The reaction is generally carried out at atmospheric pressure. However, higher or lower pressures can be employed, if desired. In addition, the reaction is usually completed within about 1 to about 4 hours and more usually from about 2 to about 3 hours.

The preferred aluminum phosphates contain from about 3 to about 30 mole % of boron based upon the moles of aluminum. The more preferred quantity of boron is between about 5 and about 30 mole % while the most preferred quantity is between about 10 and about 25 mole % based upon the moles of aluminum. Usually such preferred aluminum phosphates are prepared from boric acid and/or boric oxide. It is preferred to use boric acid rather than boric oxide since the acid is in a more usable form than the oxide.

Those aluminum phosphates which contain the boron are preferred because of improved tensile strength achieved in the final cured foundry shapes. The increased tensile strength is even evident at the lower quantity of boron such as at 3 mole %. In addition, the presence of the boron improves the stability of the cured foundry shape. The percent loss in tensile strength for the boron-containing aluminum phosphate materials after storage for 48 hours as compared to storage for 24 hours is generally lower than for those aluminum phosphates which do not contain boron. This stability effect is particularly noticeable when employing the larger quantities of boron such as from about 10 to about 30% based on the moles of aluminum.

In addition, the modification with boron is extremely advantageous since it alters the reactivity of the aluminum phosphate with the alkaline earth material in the presence of the foundry aggregate. As the level of boron in the aluminum phosphate increases, the rate of reaction with the alkaline earth material in the presence of the foundry aggregate decreases. This is particularly noticeable at boron concentrations of at least about 10 mole % based upon the moles of aluminum. Therefore, the boron modification aspect of the present invention makes it possible to readily manipulate the cure characteristics of the binder system so as to tailor the binder within certain limits, to meet the requirements of a particular foundry application.

The alteration in the cure characteristics and particularly with the free alkaline earth oxide; however, is not observed in the absence of the foundry aggregate such as the sand. This may be due to the exothermic nature of the reaction between the aluminum phosphate and free alkaline earth material oxide whereby the presence of the foundry aggregate acts as a heat sink reducing the reactivity to a level where the effect of the boron modification becomes noticeable. On the other hand, the reaction is so fast in the absence of the aggregate that any effect which the boron may have on cure is not detectable and even if detectable it is of no practical value.

In addition, the boron modification provides aluminum phosphate water solutions which exhibit greatly increased shelf stability as compared to unmodified aluminum phosphate materials. The enhanced shelf stability becomes quite significant when employing quantities of boron of at least about 5 mole % based upon the moles of aluminum.

The alkaline earth metal material employed in the present invention is any material containing an alkaline earth metal and containing an oxide which is capable of reacting with the aluminum phosphate. When the alkaline earth metal material is a free alkaline earth metal oxide or a free alkaline earth metal hydroxide, it preferably has a surface area no greater than about 8.5 m$^2$/gram as measured by the BET procedure. More preferably it has a surface area no greater than about 3 m$^2$/gram. Those free oxides and free hydroxides having surface areas no greater than about 8.5 m$^2$/gram are preferred since it has been observed that compositions of the present invention which employ such oxides and hydroxides have sufficient work times to be adequately mixed in the more conventional types of commercially available batch type mixers before introduction into the mold or pattern for shaping. Although free oxides and free hydroxides having surface areas greater than about 8.5 m$^2$/gram generally are too reactive for use with the more conventional types of commercially available batch type mixers, they are suitable when much faster mixing operations are employed such as those continuous mixing operations which may require only about 20 seconds for adequate mixing.

Those materials which contain an oxide or hydroxide and an alkaline earth metal, in chemical or physical combination with other constituents are less reactive than the free oxides and hydroxides. Accordingly, such materials can have surface areas greater than about 8.5 m$^2$/gram and can be suitable for use even when employing mixing operations which require about 2 to 4 minutes or more.

These other constituents may be present such as being chemically combined with the oxide and alkaline earth metal and/or being physically combined such as by sorption or in the form of an exterior coating. However, the mere mixing of a material with a free oxide or hydroxide without effecting the above type of uniting of the material would not materially reduce the reactivity. Therefore, such mere mixing is not included within the meaning of chemical or physical combinations as used herein.

However, it is preferred that all of the alkaline earth metal materials employed in the present invention have a surface area of no greater than about 8.5 m$^2$/gram and more preferably have a surface area of no greater than about 3 m$^2$/gram. Usually the surface areas are at least about 0.01 m$^2$/gram. All references to surface area unless the contrary is stated, refer to measurements by the BET procedure as set forth in tentative ASTMD-3037-71T method C-Nitrogen Absorption Surface Area by Continuous Flow Chromatography, Part 28, p. 1106, 1972 Edition, employing 0.1 to 0.5 grams of the alkaline earth material.

Included among the suitable materials are calcium oxides, magnesium oxides, calcium silicates, calcium aluminates, calcium aluminum silicates, magnesium silicates, and magnesium aluminates. Also included among the suitable materials of the present invention are the zirconates, borates, and titanates of the alkaline earth metals.

It is preferred to employ either a free alkaline earth metal oxide or a mixture of an alkaline earth metal oxide and a material which contains the alkaline earth metal and oxide in combination with another constituent such as calcium aluminates. In addition, the preferred alkaline earth metal oxides are the magnesium oxides.

Those materials which include components in combination with the oxide or hydroxide, and the alkaline earth metal, in some instances can be considered as being a latent source of the alkaline earth metal oxide for introducing the alkaline earth metal oxide into the binder system.

Some suitable magnesium oxide materials are available under the trade designations of Michigan 1-A from Michigan Chemical; Calcined Magnesium Oxide, −325 mesh, Cat. No. M-1016 from Cerac/Pure, Inc.; H-W Periklase Grain 94C Grade (Super Ball Mill Fines), H-W Periklase Grain 94C Grade (Regular Ball Mill Fines), and H-W Periklase Grain 98, Super Ball Bill Fines from Harbison-Walker Refractories. Michigan 1-A has a surface area of about 2.3 m$^2$/gram and Cat. No. m-1016 has a surface area of about 1.4 m$^2$/gram.

A particularly preferred calcium silicate is wollastonite which is a particularly pure mineral in which the ratio of calcium oxide to silica is substantially equal molar.

Generally commercially available calcium aluminate compositions contain from about 15 to about 40% by weight of calcium oxide and from about 35 to about 80% by weight of alumina, with the sum of the calcium oxide and alumina being at least 70% by weight. Of course, it may be desirable to obtain calcium aluminate compositions which contain greater percentages of the calcium oxide. Some suitable calcium aluminate materials can be obtained commercially under the trade designations Secar 250 and Fondu from Lone Star Lafarge Company, Lumnite, and Refcon from Universal Atlas Cement and Alcoa Calcium Aluminate Cement CA-25 from Aluminum Company of America. Fondu has a minimum surface area as measured by ASTM C115 of about 0.15 m$^2$/gram and 0.265 m$^2$/gram as measured by ASTM C205. Lumnite has a Wagner specific surface of 0.17 m$^2$/gram and Refcon has a Wagner specific surface of 0.19 m$^2$/gram.

Mixtures of a free alkaline earth metal oxide and a material containing components in combination with the free oxide or hydroxide and alkaline earth metal preferably contain from about 1 part by weight to about 10 parts and preferably from about 2 to about 8 parts by weight of the free alkaline earth metal oxide per part by weight of the material containing substituents in combination with the free metal oxide or hydroxide and alkaline earth metal. Preferably such mixtures are of magnesium oxides and calcium aluminates. The free alkaline earth metal oxide such as magnesium oxides in such mixtures are primarily responsible for achieving fast cure rates while the other component such as the calcium aluminates are mainly responsible for improving the strength characteristics of the final shaped article. Since the free metal oxide is a much more reactive material than those materials which are latent sources of the free metal oxide, those other materials will only have a minimal effect upon the cure rate when in admixture with the alkaline earth metal oxide.

Sometimes it may be desirable to employ the alkaline earth metal material in the form of a slurry or suspension in a diluent primarily to facilitate material transfer. Examples of some suitable diluents include alcohols such as ethylene glycol, furfuryl alcohol, esters such as cellosolve acetate, and hydrocarbons such as kerosene and aromatic hydrocarbons such as Hi-Sol 4-2 and Hi-Sol 10. In addition, it may be desirable to add a suspending agent to slurries of the alkaline earth material such as Bentone, Cabosil, and Carbopol in amounts up to about 10% and generally up to less than 5% to assist in stabilizing the slurry or suspension in the diluent.

Generally the alkaline earth metal material and diluent are mixed in a weight ratio of about 1:3 to about 3:1 and preferably from about 1:2 to about 2:1. It has been observed that the non-polar hydrocarbons provide the best strength characteristics as commpared to the other diluents which have been tested, when a diluent is employed. In addition, the alcohols are advantageous as diluents since they increase the work time of the foundry mix without a corresponding percentage increase in the strip time. However, the strength properties of the final foundry shape are somewhat reduced when employing alcohols such as ethylene glycol and furfuryl alcohol.

The other necessary component of the binder system employed in the present invention is water. All or a portion of the water can be supplied to the system as the carrier for the aluminum phosphate material. Also, the water can be introduced as a separate ingredient. Of course, the desired quantity of water can be incorporated in part as the water in the aluminum phosphate and in part from another source. The amount of water employed is from about 15 to about 50% by weight and preferably from about 20 to about 40% by weight based upon the total weight of the aluminum phosphate and water.

At the present time, it is contemplated that the binder compositions of the present invention are to be made available as a two-package system comprising the aluminum phosphate and water components in one package and the alkaline earth metal component in the other package. At the time of use, the contents of the package containing the alkaline earth metal component are usually admixed with the aggregate, and then the contents of the aluminum phosphate containing package are admixed with the aggregate and alkaline earth metal component composition. After a uniform distribution of the binder system on the sand particles has been obtained, the resulting foundry mix is molded into the desired shape. Methods of distributing the binder on the aggregate particles are well known to those skilled in the art. The foundry mix can, optionally, contain other ingredients such as iron oxide, ground flax fibers, wood cereals, clay pitch, refractory flours, and the like. Moreover, other materials which do not deleteriously affect the inter relationship between the aggregate, aluminum phosphate, alkaline earth metal component, and water can be employed when desired.

In the ordinary use of the compositions of the present invention to prepare foundry shapes, the following steps are employed:

1. forming a foundry mix containing an aggregate (e.g., sand) and the contents of the binder system;
2. introducing the foundry mix into a mold or pattern to thereby obtain a green foundry shape;
3. allowing the green foundry shape to remain in the mold or pattern for a time at least sufficient for the shape to obtain a minimum stripping strength (i.e., become self-supporting); and
4. thereafrer removing the shape from the mold or pattern and allowing it to cure at room temperature, thereby obtaining a hard, solid, cured foundry shape.

The binder systems of the present invention are capable of ambient temperature cure which is used herein to include curing by chemical reaction without the need of external heating means. However, within the general description of ambient temperature cure, there are a number of different ambient temperature curing mechanisms which can be employed. For example, ambient temperature cure encompasses both "air cure" and "no bake." Normally, ambient temperature cure is effected at room temperature of from about 50° F to about 100° F.

In addition, the binder systems of the present invention make possible the achievement of foundry shapes which possess improved collapsibility and shake out of the shape from the cast metal as compared to other inorganic binder systems such as the alkali metal silicates. In addition, the foundry shapes of the present invention have good scratch resistance and sag resistance immediately at strip. Accordingly, the foundry shapes of the present invention can be easily and readily handled and employed immediately after strip.

The present invention also makes it possible to prepare foundry shapes from binder systems without the necessity of employing nitrogen-containing compounds, which are a major cause of pin holes in the cast article.

It is recognized that the use of the binder system for the foundry shapes intended in the present invention is quite distinct from preparing other shaped articles such as ceramics and shapes for precision casting. In particular, a suitable binder for shapes for precision casting will not necessarily be applicable as the binder in foundry shapes of the present invention since molds for precision casting do not require binders which possess the high strength characteristics needed to prepare foundry molds. The shapes for precision castng acquire considerable strength from the aggregate employed since the particle size of the aggregate is small, and therefore, can be densely packed. Normally, the aggregate employed in precision casting has an average particle size between about 150 and about 300 mesh (Tyler). Moreover, the binder for precision casting need not cure to sufficient strength at room temperature as is accomplished in accordance with the present invention since the molds for precision casting must be heated, before being employed, to drive off volatilizable material, such as water, present in the molding composition.

If the volatiles, such as water, are not removed from a precision casting shape before use, vapor created during casting will defuse into the molten metal in view of the relatively low porosity of the shape. On the other hand, the foundry shapes of the present invention are relatively porous, therefore, the vapor produced during casting with foundry cores or molds can escape through the pores rather than diffusing into the molten metal.

Furthermore, compositions for preparing precision casting shapes are more fluid then those compositions for foundry molds and normally contain more diluent such as water and a lower aggregate to binder ratio than present in compositions for preparing foundry molds.

In addition, the requirements of a material as a binder in a ceramic application are quite different than those for binder and foundry shapes. For instance, a ceramic shape is expected to resist loss of strength characteristics at high temperatures such as above 1,500° F. Moreover, ceramic materials are heated to sintering temperatures to develop sufficient cure to retain adequate physical properties at these high temperatures. However, foundry cores and molds need to retain the necessary strength properties until the metal solidifies in the mold, but must lose such properties due to their exposure at higher temperatures so that after solidification of the metal, the cores or molds can readily be broken down for shake out or removal from the casting.

In order to further understand the present invention the following non-limiting examples are provided. All parts are by weight unless the contrary is stated. In all the examples, the foundry samples are cured by no-bake procedure at room temperature unless the contrary is stated.

EXAMPLE 1

To a reaction vessel equipped with a stirrer, thermometer, and pressure gauge, are added with agitation about 38,000 parts of an 80% aqueous solution of phosphoric acid, about 307 parts boric acid, and about 7,720 parts of hydrated alumina (Alcoa C-33). The reaction mass is heated to a temperature of about 120° F in about one-half hour at which time external heat is removed. The reaction is continued for about another 20 minutes with the temperature rising to a maximum of about 180° F due to the reaction exotherm. Then external heat is applied and reaction temperature rises to a maximum of about 235° F in about 70 minutes. The pressure in the reaction vessel rises to a maximum of about 15 psig. The reaction mass is cooled to about 155° F in about 45 minutes at which time about 5,900 parts of water are added with agitation. The reaction mass is then cooled down to 82° F under reduced pressure of about 3 inches of mercury. The vacuum is removed and about 52,000 parts of a boronated aluminum phosphate product having a solids content of 66.6%, a viscosity of 250–300 centipoises, mole ratio of phosphorus to total moles aluminum and boron of 3:1, and about 5 mole % boron based upon the moles of aluminum are obtained.

100 parts of Wedron 5010 sand and about 0.85 parts of a slurry of 0.4 parts kerosene and 0.45 parts magnesium oxide having a surface area of about 2.3 m$^2$/gm (Michigan 1-A) are admixed for about 2 minutes. According to the manufacturer, Wedron 5010 sand is 99.88% silica, 0.02% iron oxide, 0.10% aluminum oxide, 0.15% titanium dioxide, .01% calcium oxide, and 0.005% magnesium oxide, and has the following size distribution: 0.4% retained on U.S. No. 40, 11.2% retained on U.S. No. 50, 35.2% retained on U.S. No. 70, 37.4% retained on U.S. No. 100, 10.8% retained on U.S. No. 140, 4.0% retained on U.S. No. 200, 0.8% retained on U.S. No. 200, 0.8% retained on U.S. No. 270, 0.2% retained on U.S. No. 325, and 66.92 Grain fineness (AFS). To this mixture are added 3.2 parts of the boronated aluminum phosphate prepared above. The mixture is then agitated for 2 minutes.

The resulting foundry mix is formed by hand ramming into standard AFS tensile strength samples using the standard procedure. The tensile strength of the test bars is 75 psi after 2 hours, 105 psi after 4 hours, 140 psi after 6 hours, and 170 psi after 24 hours at room temperature. In addition, the composition has a work time of 10 minutes and a strip time of between 35 and 40 minutes. The scratch resistance at strip is very good and after 2 hours is excellent.

EXAMPLE 2

Example 1 is repeated except that the total binder mix is about 3.5% by weight based upon the sand with the various binder components in the same ratio as above. The resulting foundry mix is formed into standard AFS tensile strength samples using the standard procedure. The tensile strength of the test bars is 75 psi after 2 hours, 120 psi after 4 hours, 145 psi after 6 hours, and 165 psi after 24 hours at room temperature.

The samples have excellent scratch resistance after 2 hours. In addition, the work time of the composition is 10 minutes and the strip time of the composition is between 40 and 45 minutes.

EXAMPLE 3

5,000 parts of Wedron 5010 sand and 35 parts of a mixture of magnesium oxide (Michigan 1-A) and a calcium aluminate containing 58% Al$_2$O$_3$ and 33% CaO, commercially available as Refcon from Universal Atlas, in a ratio of 2.5 parts of magnesium oxide to 1 part of the calcium aluminate are mixed for about 2 minutes. To this mixture are added 165 parts of a 66% aqueous aluminum phosphate solution prepared according to the procedure of Example 1. The mixture is then agitated for 2 minutes.

The resulting foundry mix is formed into standard AFS tensile strength samples using the standard procedure. The tensile strength of the test bars after 24 hours at room temperature is 170 psi. In addition, the composition has a work time of 10 minutes and a strip time of 30 minutes. The scratch resistance at strip is very good and after 2 hours is excellent.

EXAMPLE 4

Example 3 is repeated except that 30 parts of the magnesium oxide-calcium aluminate mixtue is employed. The mixture foundry mix is formed into standard AFS tensile strength samples using the standard procedure. Tensile strength of the test bars is 80 psi after 2 hours, 160 psi after 4 hours, 178 psi after 6 hours, and 196 psi after 24 hours at room temperature. In addition, the composition has a work time of 15 and a strip time of 45 minutes.

The following Examples 5–9 illustrate the effect of the surface area of the alkaline earth metal oxide containing material when it is a free oxide such as MgO.

EXAMPLE 5

5,000 parts of Wedron 5010 silica sand and 25 parts of magnesium oxide having a surface area of about 2.3 m$^2$/gram commercially available from Michigan Chemical as Michigan 1-A are mixed for about 2 minutes. To this mixture are added 165 parts of a 66% aluminum phosphate solution prepared according to the procedure of Example 1. The mixture is then agitated for 2 minutes. The resulting foundry mix has a work time between 10 and 20 minutes.

EXAMPLE 6

Example 5 is repeated except that the magnesium oxide employed has a surface area of about 1.4 m$^2$/gram and is commercially available under the trade designation Calcined Magnesium Oxide, -325 mesh Cat. No. M-1016 and the aluminum phosphate contains 10 mole % based upon the moles of aluminum. The foundry mix has a work time of about 15 minutes.

EXAMPLE 7

Example 6 is repeated except that the magnesium oxide employed has a surface area of about 35.2 m²/gram and is commercially available as Magox 98 LR. The composition has a work time of less than 2 minutes, and therefore; requires the use of a relatively fast mixing operation.

EXAMPLE 8

Example 6 is repeated except that the magnesium oxide has a surface area of about 61.3 m²/gram and is commercially available as Michigan 1782. The composition has a work time of less than 2 minutes, and therefore; requires the use of a relatively fast mixing operation.

EXAMPLE 9

Example 5 is repeated except that the magnesium oxide has a surface area of about 8.2 m²/gram and is obtained by calcining Michigan 1782 at 1,000° C for 24 hours and the aluminum phosphate contains 30 mole % boron based upon the moles of aluminum. The composition has a work time of between 2 and 4 minutes and therefore can be adequately mixed into a foundry mix employing the more conventional mixing operations. However, the work time may be somewhat shorter than that necessary for safely mixing and forming the desired shape before curing for some operations.

EXAMPLE 10

The following Table 1 illustrates the effect of employing different levels of boron on the work time and strip time of foundry sand compositions. The compositions are prepared by mixing for about 2 minutes 5,000 parts of Wedron 5010 silica sand and the amount specified in Table 1 of a mixture of magnesium oxide (Michigan 1-A) and a calcium aluminate containing 58% $Al_2O_3$ and 33% CaO (commercially available as Refcon from Universal Atlas) in a ratio of 2.5 parts of magnesium oxide to 1 part of calcium aluminate. To the mixture are added 165 parts of the aluminum phosphate solutions specified in Table 1. The aluminum phosphate solutions are obtained from a mole ratio of phosphorus to total moles of aluminum and boron of 3:1.

Table 1

Effect of Boron Level on Work Time and Strip Time WT(min.)/ST(min.)

| Boron Level | 68% Aqueous Aluminum Phosphate Solution | | 66% Aqueous Aluminum Phosphate Solution | |
|---|---|---|---|---|
| | 25 parts MgO-Ca aluminate mix | 30 parts MgO-Ca aluminate mix | 25 parts MgO-Ca aluminate mix | 30 parts MgO-Ca aluminate mix |
| 30% | 30/>100 | 20/80 | 25/150 | 15/75 |
| 20% | 25/100 | 15/60 | 30/>90 | 15/70 |
| 10% | 20/90 | 15/60 | 20/80 | 10/55 |
| 5% | 15/75 | 10/60 | 15/75 | 10/50 |
| 3% | 15/75 | 10/55 | 10/65 | 10/50 |
| 1% | 10/70 | 10/50 | 10/70 | 10/50 |
| 0% | 10/65 | 10/50 | 10/65 | 10/50 |

In addition, storage tests on the various aluminum phosphate solutions employed in this example reveal that some precipitation from 0, 1 and 3 mole % boron occurs after only 14 days storage. The other aluminum phosphate solutions remain clear.

The various foundry mix compositions employed in this example are formed in standard AFS tensile strength samples using the standard procedure. The tensile strength results after 24 hours and 48 hours at room temperature are recorded on Tables II and III, below. It is evident from Tables II and III that the aluminum phosphate obtained from boron generally provides improved tensile strength characteristics. It is apparent that the general trend is improvement in tensile strength with increasing quantities of boron, although a few of the tensile strengths do not fit the general behavior due to some experimental error.

Table II

Effect of Boron Level on Tensile Strength at 24 Hours after Strip

| Boron Level | 68% Aqueous Aluminum Phosphate Solution | | 66% Aqueous Aluminum Phosphate Solution | |
|---|---|---|---|---|
| | 25 parts MgO-Ca aluminate mix | 30 parts MgO-Ca aluminate mix | 25 parts MgO-Ca aluminate mix | 30 parts MgO-Ca aluminate mix |
| 30% | 190 | 164 | 174 | 159 |
| 20% | 181 | 172 | 182 | 162 |
| 10% | 170 | 146 | 167 | 132 |
| 5% | 162 | 133 | 174 | 135 |
| 3% | | 147 | 165 | 140 |
| 1% | 162 | 140 | 150 | 124 |
| 0% | 157 | 150 | 157 | 103 |

Table III

Effect of Boron Level on Tensile Strength at 48 Hours after Strip

| Boron Level | 68% Aqueous Aluminum Phosphate Solution | | 66% Aqueous Aluminum Phosphate Solution | |
|---|---|---|---|---|
| | 25 parts MgO-Ca aluminate mix | 30 parts MgO-Ca aluminate mix | 25 parts MgO-Ca aluminate mix | 30 parts MgO-Ca aluminate mix |
| 30% | 182 | 156 | 171 | 160 |
| 20% | 171 | 164 | 152 | 138 |
| 10% | 156 | 137 | 165 | 126 |
| 5% | 158 | 150 | 170 | 116 |
| 3% | 164 | 126 | 147 | 126 |
| 1% | 152 | 130 | 130 | 113 |
| 0% | 140 | 120 | 142 | 90 |

EXAMPLE 11

The following Table IV further illustrates the improved shelf stability obtained by employing boron.

Table IV

Stability of Aluminum Phosphate Solution

| Mole Ratio of Aluminum + Boron to Phosphorus | % Solids | Boron Level (Mole % of Aluminum) | Appearance |
|---|---|---|---|
| 1:3.8 | 77% | 20% | Clear after 5 months |
| 1:3.8 | 77% | 10% | Clear after 5½ months |
| 1:3.8 | 77% | 5% | Clear after 5½ months |
| 1:3.8 | 77% | 0% | Clear after 6 months |
| 1:3.6 | 76% | 40% | Clear after 5 months |
| 1:3.6 | 76% | 20% | Clear after 5 months |
| 1:3.6 | 76% | 10% | Clear after 5 months |
| 1:3.6 | 76% | 5% | Clear after 5 months |
| 1:3.6 | 75% | 0% | Slight preci- |

Table IV-continued

Stability of Aluminum Phosphate Solution

| Mole Ratio of Aluminum + Boron to Phosphorus | % Solids | Boron Level (Mole % of Aluminum) | Appearance |
| --- | --- | --- | --- |
| 1:3.4 | 75% | 20% | pitation after 5 months |
| 1:3.4 | 75% | 20% | Clear after 5 months |
| 1:3.4 | 75% | 20% | Clear after 4 months |
| 1:3.4 | 75% | 10% | Clear after 4½ months |
| 1:3.4 | 75% | 10% | Clear after 4 months |
| 1:3.4 | 75% | 5% | Clear for 1½ months then precipitated |
| 1:3.4 | 75% | 5% | Clear for 2 months then precipitated |
| 1:3.4 | 75% | 0% | Clear for 1 month then precipitated |
| 1:3.2 | 75% | 5% | Clear for 1 month then precipitated |
| 1:3.1 | 75% | 10% | Clear after 2 months |

| | | | Appearance After About 2½ months |
| --- | --- | --- | --- |
| 1:3.0 | 75% | 30% | Clear |
| 1:3.0 | 68% | 30% | Clear |
| 1:3.0 | 67% | 30% | Clear |
| 1:3.0 | 65% | 30% | Clear |
| 1:3.0 | 75% | 20% | Clear |
| 1:3.0 | 68% | 20% | clear |
| 1:3.0 | 67% | 20% | Clear |
| 1:3.0 | 65% | 20% | Clear |
| 1:3.0 | 75% | 10% | Clear |
| 1:3.0 | 68% | 10% | Clear |
| 1:3.0 | 67% | 10% | Clear |
| 1:3.0 | 65% | 10% | Clear |
| 1:3.0 | 75% | 5% | Clear |
| 1:3.0 | 68% | 5% | Clear |
| 1:3.0 | 67% | 5% | Clear |
| 1:3.0 | 65% | 5% | Clear |
| 1:3.0 | 75% | 3% | Clear |
| 1:3.0 | 68% | 3% | Precipitated |
| 1:3.0 | 67% | 3% | Clear |
| 1:3.0 | 65% | 3% | Clear |
| 1:3.0 | 75% | 1% | Clear |
| 1:3.0 | 68% | 1% | Precipitated |
| 1:3.0 | 67% | 1% | Precipitated |
| 1:3.0 | 65% | 1% | Precipitated |
| 1:3.0 | 75% | 0% | Clear |
| 1:3.0 | 68% | 0% | Precipitated |
| 1:3.0 | 67% | 0% | Precipitated |
| 1:3.0 | 65% | 0% | Slight Precipitation |

The following examples 12 and 13 illustrate the improved scratch resistance and sag resistance at strip of foundry shapes prepared according to the present invention as compared to the scratch resistance and sag resistance at strip of foundry shapes prepared from other prior art inorganic binder systems.

EXAMPLE 12

20,000 parts of Port Cresent Lake sand and 200 parts of a mixture of 60 parts kerosene, 85.6 parts of magnesium oxide (Michigan 1-A) and 34.4 parts of calcium aluminate containing 58% $Al_2O_3$ and 33% CaO, commercially available as Refcon from Universal Atlas, are mixed for about 2 minutes. To this mixture are added 660 parts of a 66% aqueous aluminum phosphate solution prepared according to the procedure of Example 1, having a viscosity of 250-300 centipoises, a mole ratio of phosphorus to total moles of aluminum and boron of 3:1 and about 10 mole % of boron based upon the moles of aluminum. The mixture is then agitated for 2 minutes.

The resulting foundry mix is formed into 4 inch by 4 inch by 18 inch sand cores weighing about 19 pounds each. The composition has a work time of 10 minutes and a strip time of 45 minutes. The scratch resistance of the cores at strip is 85-90 and after 1 hour is 90-95.

Three core samples are laid horizontally on the edge of a lab table at strip so that 6 inches extend over the table without support. The cores are allowed to remain in this position for 1 hour. After one hour, a slight sag of the cores is noted which measures no more than one-sixteenth of an inch from the horizontal.

Likewise, sag tests are conducted for the cores employing three core samples each, whereby the cores are supported at the extremities leaving the central portion unsupported, and whereby the cores are supported at the center with the ends unsupported, and by allowing the cores to remain in a vertical position supported by its 4 inch × 4 inch base.

In all instances, no noticeable sag is observed for these cores and no slump is noted after standing for 24 hours.

In addition, three cores are prepared and immediately wrapped in plastic bags at strip and then supported horizontally at the extremities and three other cores are prepared and wrapped in plastic bags at strip and supported horizontally in the center. Some sag on these cores is observed within the first hour.

Two 4 inch × 4 inch × 18 inch cores are prepared from the above compositions whereby hooks are inserted 3 inches in from each end of the core at a depth of about 2 inches. One of the cores is stripped in 30 minutes and suspended from each end in a horizontal position. This core slumps and breaks within 3 minutes. The other core is stripped in 45 minutes and immediately suspended in a horizontal position from both ends. This core remains in this position for 24 hours without any noticeable sag.

A five gallon pail is filled with a sand mix containing the above sand-binder composition. A hook is inserted through a depth of 4 inches in the center of the core and the system suspended at strip time of 45 minutes. Total weight suspended is 73 pounds and after 24 hours, no evidence of the hook breaking from the core is detected. At this time an additional 170 pounds are placed on the suspended core for 5 minutes with no adverse effects.

Standard tensile strength specimens are also prepared from the above compositions whereby specimens are taken immediately after mixing and at 5, 10, and 17 minute intervals after mixing. Overnight strengths of the product are 206 psi for specimens prepared immediately after mixing, 160 psi for specimens prepared after 10 minutes mixing and 60 psi for specimens prepared after 17 minutes mixing. The drop in tensile strength after 5 minutes mixing indicates that the binder reaction is proceeding somewhat faster than desired. In addition, some degradation of the core properties occurs during storage. For instance, the cores have an average scratch hardness of 70 after 4 days as compared to the initial scratch hardness.

EXAMPLE 13

10,000 parts of Port Crescent Lake sand and 42 parts of an organic ester hardener commercially available under the trade designation Chem. Rez 3000 are mixed for about 2 minutes. To this mixture are added 350 parts of a sodium silicate binder having a 2.4:1 ratio of $SiO_2$ to $Na_2O$ commercially available under the trade designation Chem. Rez 318. The mixture is then agitated for 2 minutes.

The composition has a work time of 20 minutes and a strip time of 45 minutes, the scratch resistance of the cores is only 9–10 at strip and about 80–90 after 3 hours of storing. The composition is formed into 4 inch × 4 inch × 18 inch sand cores weighing about 19 pounds. Three of the cores are laid horizontally on the edge of the lab table at strip so that 6 inches extends over the lab table without support. These cores sag from one-half inch to three-fourth inches from the horizontal. Likewise, other sag tests are conducted wherein 3 cores are supported at the extremities leaving the central portion unsupported, and three cores are supported at the center with the ends unsupported, and three cores are allowed to remain in the vertical position supported by their 4 inch × 4 inch base. It is observed that the cores sag at least one-half inch from the horizontal within 1 hour and in one instance the core completely breaks in half. In addition, the core supported in the vertical position settles somewhat with a slight bulge towards the center. The scratch resistance of the cores after 1 hour is between 30 and 40. In addition, three cores are prepared and immediately wrapped in plastic bags at strip and supported horizontally at the extremities and at the center. The cores sag from about one-fourth to about three-fourth inches and the cores exhibit a much greater degree of slump as compared to the same test carried out with the composition of Example 12.

A comparison of Examples 12 and 13 clearly demonstrates the improved scratch resistance at strip and sag resistance at strip achieved by the binders of the present invention as compared to other common inorganic binders. Moreover, it is quite apparent that in view of the relative hardness of the cores prepared according to the present invention at strip, it is much easier to handle such cores than to handle cores obtained from the sodium silicate binders.

What is claimed is:

1. Composition for the fabrication of foundry shapes having a porosity sufficient to permit escape from the shape of at least most of the volatiles formed during casting which comprises:
    a. a major amount of foundry aggregate in sufficient quantity and having particle size large enough to provide sufficient porosity in the foundry shape to permit escape of volatiles from the shape during casting;
    B. an effective bonding amount up to about 10% by weight based upon the weight of the aggregate of a composition comprising:
        1. an aluminum phosphate containing from about 3 mole % to about 40 mole % of boron based upon the moles of aluminum, and being obtained from aluminum-containing reactant, phosphorus-containing reactant, and boron-containing reactant wherein the mole ratio of phosphorus to total moles of aluminum and boron is from about 2:1 to about 4:1;
        2. an oxygen-containing alkaline earth compound capable of reacting with the aluminum phosphate and which contains an alkaline earth metal and an oxide; and wherein the alkaline earth compound includes a free alkaline earth metal oxide and/or free alkaline earth metal hydroxide, and wherein the free alkaline earth metal oxide and/or free alkaline earth metal hydroxide has a surface area of no greater than about 8.5 m$^2$/gram; and
        3. water;
    C. and wherein the amount of said aluminum phosphate is from about 60 to about 95% by weight based upon the total weight of (1) and (2), the amount of said alkaline earth material is from about 5 to about 40% by weight based upon the total weight of (1) and (2); and the amount of said water is from about 15 to about 50% by weight based upon the total weight of (1) and (3).

2. The composition of claim 1 wherein said foundry aggregate is sand.

3. The composition of claim 1 wherein at least about 80% of said foundry aggregate has an average particle size no smaller than about 150 mesh (Tyler screen mesh).

4. The composition of claim 1 wherein at least about 80% of said foundry aggregate has an average particle size between about 50 and about 120 mesh (Tyler screen mesh).

5. The composition of claim 1 wherein said foundry aggregate is silica sand wherein at least about 70 weight % of the sand is silica.

6. The composition of claim 1 wherein the binder composition is present in an amount from about 1 to about 5% by weight based upon the weight of the foundry aggregate.

7. The composition of claim 1 wherein the aluminum phosphate has a mole ratio of phosphorus to total moles of aluminum and boron of about 2.5:1 to about 3.5:1.

8. The composition of claim 1 wherein the aluminum phosphate has a mole ratio of phosphorus to total moles of aluminum and boron of about 2.8:1 to about 3.2:1.

9. The composition of claim 1 wherein said aluminum phosphate contains boron in an amount of from about 3 to about 30 mole % based upon the moles of aluminum.

10. The composition of claim 1 wherein the aluminum phosphate contains boron in an amount from about 5 to about 30 mole % based upon the moles of aluminum.

11. The composition of claim 1 wherein the aluminum phosphate contains boron in an amount between about 10 and about 25 mole % based upon the moles of aluminum.

12. The composition of claim 1 wherein said free alkaline earth metal oxide and/or free alkaline earth metal hydroxide has a surface area of no greater than about 3 m$^2$/gram.

13. The composition of claim 1 wherein said alkaline earth material includes magnesium oxide.

14. The composition of claim 1 wherein said alkaline earth metal compound is a mixture of magnesium oxide and calcium aluminate.

15. The composition of claim 13 wherein said mixture contains from about 1 to about 10 parts by weight magnesium oxide per part by weight of calcium aluminate.

16. The composition of claim 13 wherein said mixture contains from about 2 to about 8 parts by weight magnesium oxide per part by weight of calcium aluminate.

17. The composition of claim 1 wherein the alkaline earth metal compound is employed in the form of a slurry or suspension in diluent.

18. The composition of claim 16 wherein said diluent is a hydrocarbon.

19. The composition of claim 16 wherein said diluent is kerosene and wherein the alkaline earth metal compound and kerosene are in a weight ratio of 1:3 to about 3:1.

20. The composition of claim 1 wherein the amount of water is from about 20 to about 40% by weight based upon the total weight of the aluminum phosphate and water.

21. The composition of claim 1 wherein the amount of aluminum phosphate is from about 65 to about 90% by weight based upon the weight of the aluminum phosphate and alkaline earth compound, and wherein the amount of alkaline earth compound is from about 10 to about 35% by weight based upon the weight of the aluminum phosphate and alkaline earth compound.

22. The process for forming a foundry mix which comprises mixing foundry aggregate with a bonding amount of up to about 10% by weight based upon the weight of the aggregate of the binder composition of claim 1, and wherein the quantity and particle size of said aggregate are such to provide sufficient porosity in the foundry shape to permit escape of volatiles from the shape during casting.

23. The composition of claim 1 wherein at least about 80% of said foundry aggregate has an average particle size no smaller than about 150 mesh (Tyler screen mesh); wherein the aluminum phosphate has a mole ratio of phosphorus to total moles of aluminum and boron of about 2.5:1 to about 3.5:1; wherein the aluminum phosphate contains boron in an amount from about 5 to about 30 mole % based upon the moles of aluminum; said alkaline earth compound includes free alkaline earth metal oxide and/or free alkaline earth metal hydroxide, and wherein said free alkaline earth metal oxide and/or free alkaline earth metal hydroxide has a surface area of no greater than about 3 m$^2$/grams.

24. A process for the fabrication of foundry shape which comprises:
A. mixing foundry aggregate with a bonding amount of up to about 10% by weight based upon the weight of the aggregate of the binder composition of claim 1, and wherein the quantity and particle size of said aggregate are such to provide sufficent porosity in the foundry shape to permit escape of volatiles from the shape during casting;
B. introducing the foundry mix obtained from step (A) into a pattern;
C. allowing the foundry mix to remain in the pattern for a time at least sufficient for the mix to become self-supporting; and
D. thereafter removing the shaped foundry mix of step (C) from the pattern, and allowing it to cure at room temperature, thereby obtaining a hard, solid, cured foundry shape.

* * * * *